US008498017B2

(12) United States Patent
Robinson

(10) Patent No.: US 8,498,017 B2
(45) Date of Patent: Jul. 30, 2013

(54) METHOD FOR GENERATING A SOFT PROOF FOR A PLURALITY OF COLOR PRINTERS

(75) Inventor: David C. Robinson, Penfield, NY (US)

(73) Assignee: Xerox Corporation, Norwalk, CT (US)

(*) Notice: Subject to any disclaimer, the term of this patent is extended or adjusted under 35 U.S.C. 154(b) by 403 days.

(21) Appl. No.: 12/877,146

(22) Filed: Sep. 8, 2010

(65) Prior Publication Data

US 2012/0057176 A1 Mar. 8, 2012

(51) Int. Cl.
*H04N 1/60* (2006.01)

(52) U.S. Cl.
USPC .............................. 358/1.9; 358/501; 358/527

(58) Field of Classification Search
USPC .................... 358/1.1, 1.9, 500, 501, 518, 527
See application file for complete search history.

(56) References Cited

U.S. PATENT DOCUMENTS

| | | | |
|---|---|---|---|
| 5,287,194 A | 2/1994 | Lobiondo | |
| 5,524,181 A | 6/1996 | Sung et al. | |
| 5,748,342 A * | 5/1998 | Usami | 358/500 |
| 6,108,009 A * | 8/2000 | Nishikawa | 345/590 |
| 6,310,692 B1 | 10/2001 | Fan et al. | |
| 6,381,036 B1 | 4/2002 | Olson | |
| 6,693,723 B2 | 2/2004 | Keithley et al. | |
| 2003/0011812 A1 | 1/2003 | Sesek et al. | |
| 2004/0263906 A1 | 12/2004 | Uchida et al. | |
| 2007/0024880 A1* | 2/2007 | Sato et al. | 358/1.9 |
| 2007/0133027 A1 | 6/2007 | Salgado et al. | |
| 2007/0242303 A1 | 10/2007 | Barry et al. | |
| 2008/0112001 A1 | 5/2008 | Hartupee et al. | |
| 2008/0158579 A1* | 7/2008 | Ohga et al. | 358/1.9 |
| 2008/0198015 A1 | 8/2008 | Lawrence et al. | |
| 2008/0204829 A1* | 8/2008 | Harrington | 358/504 |
| 2008/0235158 A1 | 9/2008 | Manchala et al. | |
| 2009/0066973 A1 | 3/2009 | Robinson | |
| 2012/0043751 A1* | 2/2012 | Hersch et al. | 283/92 |
| 2012/0062911 A1 | 3/2012 | Robinson | |

OTHER PUBLICATIONS

An Unofficial Copy of the Prosecution History Between Mar. 28, 2012 and Aug. 15, 2012 for U.S. Appl. No. 11/851,823, filed Sep. 7, 2007, Published Mar. 12, 2009, as US 2009-0066973 A1; Inventor: David C. Robinson.
An Unofficial Copy of the Prosecution History as of Aug. 15, 2012 for U.S. Appl. No. 12/880,317, filed Sep. 13, 2010, Published Mar. 15, 2012, as US-2012-0062911-A1; Inventor: David C. Robinson.
An Unofficial Copy of the Prosecution History as of Mar. 27, 2012 for U.S. Appl. No. 11/851,823, filed Sep. 7, 2007, Published Mar. 12, 2009, as US 2009-0066973 A1; Inventor: David C. Robinson.
An Unofficial Copy of the Prosecution History Between Aug. 16, 2012 and Mar. 2, 2013 for U.S. Appl. No. 12/880,317, filed Sep. 13, 2010, Published Mar. 15, 2012, as US-2012-0062911-A1; Inventor: David C. Robinson.

* cited by examiner

*Primary Examiner* — Thomas D Lee
(74) *Attorney, Agent, or Firm* — Michael J. Nickerson; Basch & Nickerson LLP

(57) ABSTRACT

A system and method allows a user to display the appearance of an image when printed on one of a plurality of configurable color printers. The configurable color printers include at least one replaceable colorant. The system and method take the effect of the currently mounted colorant into account when generating the displayed image. The displayed image can be used as a soft proof for printing purposes.

3 Claims, 3 Drawing Sheets

METHOD FOR GENERATING A SOFT PROOF FOR A PLURALITY OF COLOR PRINTERS

BACKGROUND

Conventionally, jobs that are sent to a printing facility to be printed have print quality requirements attached thereto. Moreover, conventionally, a printing establishment produces a proof print for approval by the customer prior to printing. The proof print ensures that the print quality of the prints meet the requirements imposed by the originators of the documents.

As an alternative to an actual proof print, a soft proof, that is an electronic image, may be substituted for the hard copy print. A system that is used to generate soft proofs should produce an image that is a faithful representation of the equivalent hard copy print. The soft proof should be faithful enough so that a designer of an image to be printed can be sure that the resulting prints will meet some set of print quality requirements.

Many conventional color printers utilize more than the standard four colorants (CMYK). The extra colorants utilized by these machines enable the extending of the gamut of the printer or to provide the ability to print a specific color directly instead of reproducing the specific color by a CMYK combination.

Furthermore, conventional printers have utilized additional colorants, not as part of the fixed set, but rather as an expanded set of colorants which may be attached to the printer at any time.

Having replaceable colorants allows printing of specialized colors to an exacting specification. An example of such a specialized color is printing of a corporate logo in a very specific color; e.g. Pantone 32.

When a print establishment has one or more configurable color printers, each job would require installing the set of configurable colorants needed for the job. However, a significant amount of time can be lost due to the overhead associated with changing the colorants. This overhead may be reduced by scheduling the jobs so that jobs with similar colorant requirements are processed together, thereby reducing the overhead associated with changing colorants.

When a printing establishment has multiple printers with various configurations, there are options for how to produce a print from a submitted job. For example, a job may specify a specific spot color.

Conventionally, this job would be printed by mounting a configurable color housing containing the required spot colorant. However, the required spot color may not be available, or there are time constraints that make alternatives to the specific spot color desirable.

For example, a customer may be willing to reproduce the spot color by a combination of CMYK colorants as opposed to the single spot color. Other alternatives may also be available using various combinations of colorants.

However, if the customer approval is done using a soft proof, the soft proof should take into account the differences in print appearance due to the different combinations of colorants. Furthermore, the different combinations of colorants can also produce other differences in the final print other than those due to the different colorant combinations.

As an example, producing a color using a combination of CMYK colorants may match the equivalent spot color closely, but the CMYK combination may have different noise characteristics.

Therefore, it would be desirable to have a soft proof system that produces an image that takes into account the different colorant options that may be used to produce the print.

BRIEF DESCRIPTION OF THE DRAWING

The drawings are only for purposes of illustrating various embodiments and are not to be construed as limiting, wherein.

DETAILED DESCRIPTION

Figure 1:
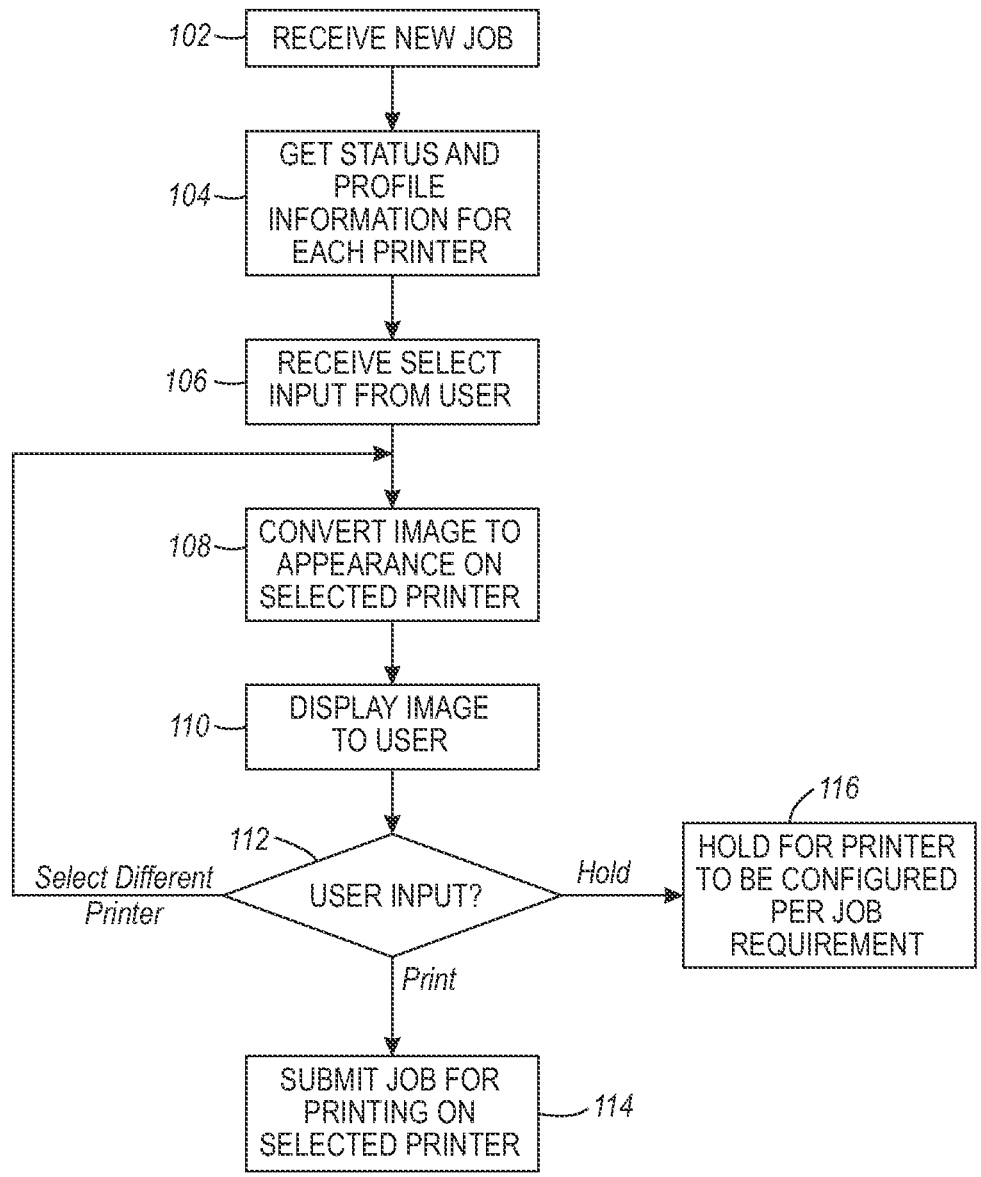
FIG. 1 illustrates a method for producing a soft proof print that corresponds to the print to be produced by a configurable color printer.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

FIG. 1 illustrates in flowchart of a method to allow a user to select from one of a number of configurable color printers by showing a soft proof image of a print job as it would be produced by a printer selected by the user.

In S102, a print job is received from a user. The print job may contain certain color requirements. These requirements may include the use of specific special colors. The specific special colors may include spot colors or the use of gamut extending colors.

The configurable printers may include the usual CMYK colorant set and in addition at least one replaceable colorant which may be changed for each print job. The replaceable colorants allow the printer to print special colors or expand the color gamut of the printer.

If none of the printers have the requested colorant or colorants mounted at the time the job is received, there is overhead and hence delay in changing the replaceable colorant, or alternatively the requested colorant may not be immediately available. If the user has time deadlines, the user may wish to use an alternative colorant set to produce the print job in a more timely fashion.

Alternatively, the requested colorants may have a significant cost premium compared to other alternatives. Hence, by presenting the user with a soft proof showing the appearance of the print job using alternate colorant sets, the system provides various options for the user to meet time or cost goals.

In S104, the status of each printer is collected. The status may include showing the readiness of each printer and some estimate of when the printer will be finished with its current job if it is currently printing. The status may also include a configuration showing the currently mounted set of colorants.

Finally, the status may also include profile information relevant to the current colorant set. The profile information includes a specification that defines the transformation between the color produced by any combination of the currently mounted colorants and the definition of the color in some device independent color space.

An example of profile information is an International Color Consortium, ICC, profile. The format and content of an ICC profile is defined in the ICC specification. The ICC profile specification teaches how to generate a set of parameters that allow transformations of color between device dependent e.g. CMYK percentages color specification and a device independent e.g. CIEL*a*b* color specification. By combining the profile information of two devices, a color specification in the device space of one device can be transformed to the color specification of the second device.

In S106, the user selects one of the available printers. This selection may be done at a specialized terminal or at a general purpose personal computer. The computer or terminal may be located at the print facility housing the printers or it may be connected from a remote location by means of a network connection.

In response to the user selection request, in S108, the image is converted from the color specification within the print job to a form that will display on the user's terminal or computer. The image to be displayed is a visualization of the print job as it would appear if printed on the selected printer. The conversion takes into account the current colorant set of the printer and the characteristics of the current user terminal to produce the soft proof display.

In S110, the soft proof version of the print job is displayed on the user's terminal for inspection. The user may decide that the presented version meets the print quality requirements that are part of the print job. Alternatively, the user may find some print quality issue with the print job as printed on the selected printer.

In S112, the user indicates a preference by providing an input request. This request may take the form of selecting a different printer to see if the newly selected printer may better meet the job requirements. If this is the case, control continues back at S108.

When the user indicates at S112 that the currently selected printer meets the job color requirements, control passes to S114 where the job is queued for printing on the currently selected printer.

When the user indicates at S112 that none of the currently configured printers meet the print job requirements, control transfers to S116 where the job is held until one of the configurable color printers can be reconfigured to meet the specific job requirements. This may include replacing one or more of the colorants with the specifically requested colorants.

Figure 2:
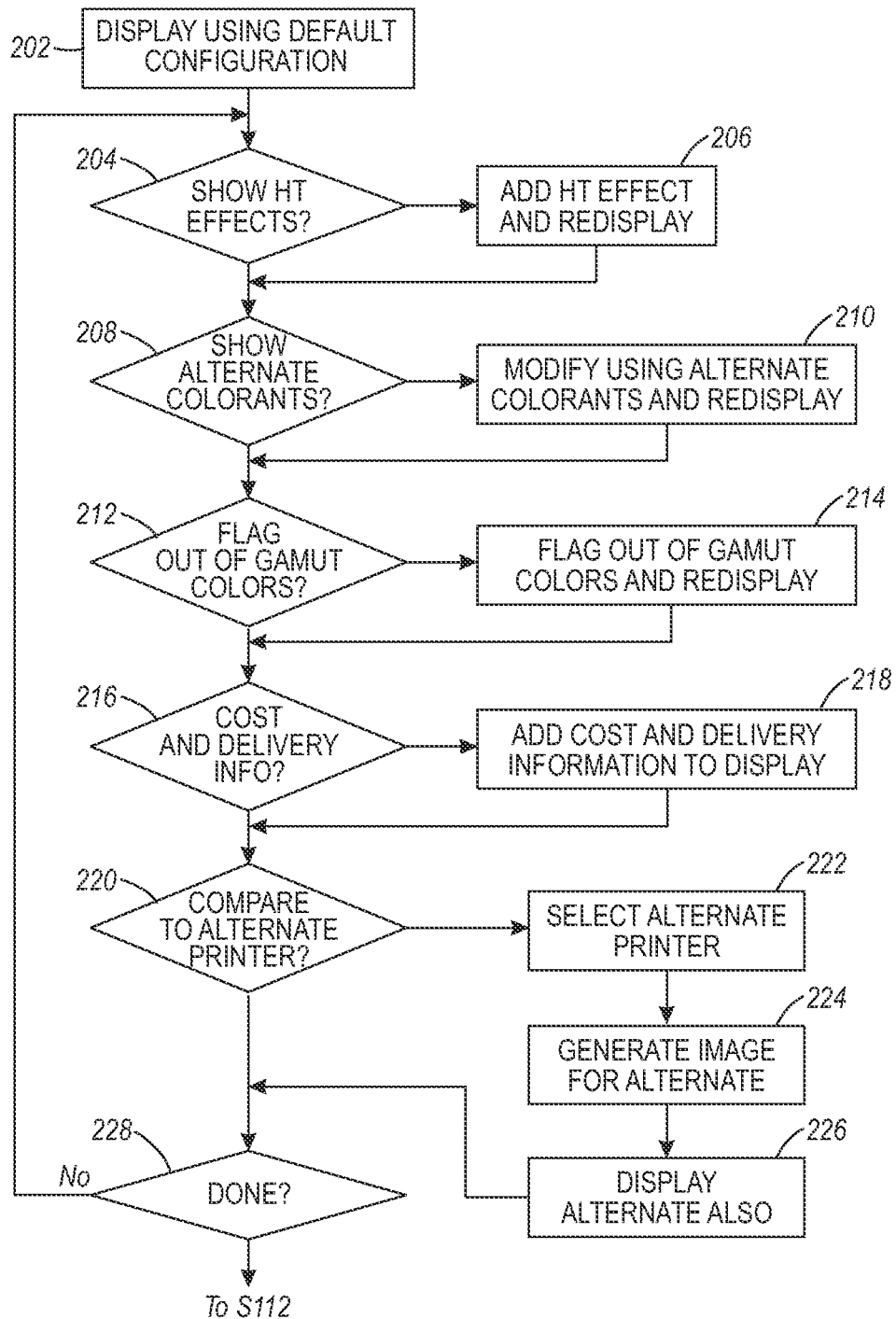
FIG. 2 illustrates an expanded version of producing a soft proof.

FIG. 2 shows a more detailed illustration of displaying the soft proof on the display. More specifically, FIG. 2 illustrates possible options that a user may wish to use to evaluate the suitability of a printer to meet print quality requirements.

FIG. 2 shows an exemplary way by which a user may select various options for displaying the results to be expected for a particular combination of printer options. By selecting the options, a user can see if some combination of options for the selected printer can generate the desired level of print quality. Alternatively, by selecting the options of FIG. 2 a direct comparison between two alternative printers can be realized.

In S202, the image is displayed using the default configuration of the printer. The particular printer has been selected previously in S106 of FIG. 1. The default configuration is defined as a part of the printer profile information retrieved from the printer in S104 of FIG. 1. The default condition may include the combination of colorants that will be used if no specific colorant specifications are attached to a print job submitted to the printer.

For example, a color printer with extra colorants may simply show the image as it would be printed using only CMYK colorants. Alternatively, the default configuration may be to use CMYK colorants for all colors except those corresponding to the replaceable colorants currently installed in the printer.

For any image requirements that request an installed colorant, the colorant is used in place of a CMYK combination. Other options for default configurations would be readily apparent to those skilled in the art.

In S204, the user can select to display any effects on the image quality due to any halftoning employed by the printer. The selection of halftone effects may include selecting between alternate halftone algorithms if such alternatives are available. If the user desires to see the halftone effects, the halftone effects are added to the image in S206 and the modified image is redisplayed.

In S208, the user can select to see the effects of using alternate colorant combinations to produce special colors. This option may be used if the special colorant is not currently available or is not installed on the selected printer. In such a case alternate ways of producing the desired color are available, for example by using CMYK combinations instead of custom colors. The selection of alternate colorant combinations in S208 may include an option for the user to specify which alternate colorant combinations are to be used, if such a specification is appropriate. When the user selects this option, the image is modified to reflect the effect of using the alternate colorant combinations in S210 and is redisplayed.

In S212, the user can select to see which colors in the job will be out of the gamut of the printer. Since not all colors can be produced by all printers, it may be important to see which colors are outside of the printer's gamut. The presence of out of gamut colors may not only introduce distortions due to the color difference between the desired color and the color that is produced, but the out of gamut colors can also affect the noise properties of the image.

If the user selects this option in S214, the out of gamut colors are identified and flagged in some manner and the flagged image is redisplayed. The out of gamut colors can be identified in a variety of ways that are familiar to those skilled in the art.

In S216, the user can ask to see the cost and delivery parameters for the currently selected printer. This information may be used to choose between producing the print job using the exact colors specified as opposed to alternate colorant combinations. It may be the case that using alternate colorant combinations may result in lower costs or in shorter delivery times which may be important to a user's decision process. In S218, the cost and delivery information is added to the display.

The delivery information may take into account the time needed for the selected printer to complete any current print jobs. The delivery information may further include the time needed to print jobs that have been queued for the printer but have not yet been printed. The cost information may include alternate costs associated with increasing the priority of the print job. Such priority increases may move the job to the top of the print queue, but may incur added costs.

In S220, a user can elect to see a side by side display of the image as produced on the currently selected printer and a second alternate printer. When a user chooses this option, in S222, the alternate printer is selected by a user. The selection may be made by choosing from a menu that identifies the configuration of printers. Once the alternate printer has been chosen by a user, in S224, the print job is converted using the profile of the selected alternate printer.

In S226, the converted alternate printer image is displayed side by side with the previously selected printer image. A user may then use the comparison to choose the alternate printer or a user may choose another printer altogether.

In S228, a user can indicate that the user is done selecting the various options. If the user is done, control continues at S112 of FIG. 1. If the user wishes to change the options, control goes back to S204.

While FIG. 2 shows the various options being selected serially, in practice it will be recognized by those skilled in the art that alternative implementations may allow selection of more than one option at a time.

For example, a user may choose to display halftone effects and out of gamut colors and then display the combined effects rather than selecting one and then the other. The serial illustration of FIG. 2 has been chosen for simplicity of explanation.

Figure 3:
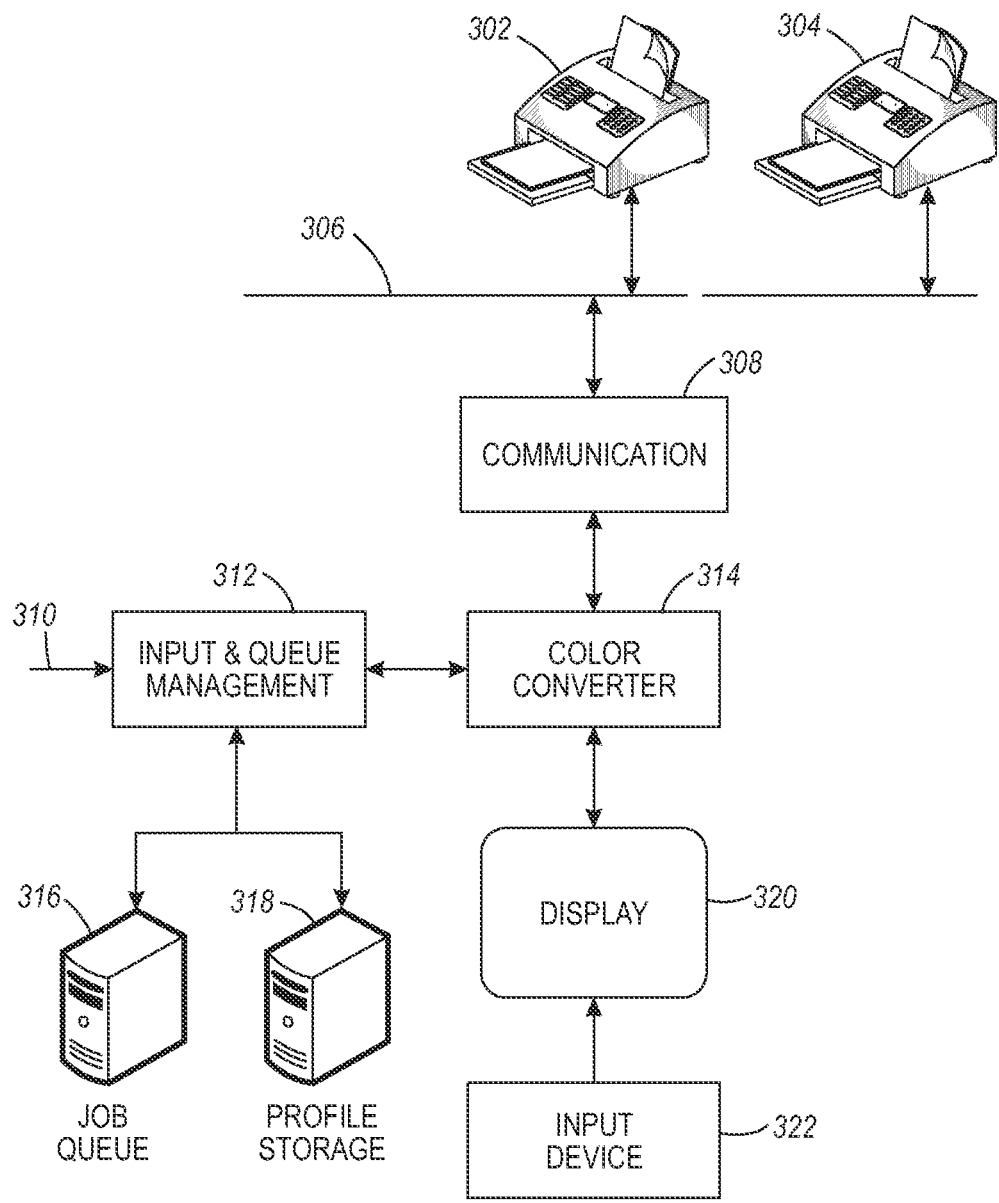
FIG. 3 illustrates a system for producing a soft proof print that corresponds to the print to be produced by a configurable color printer.

The method of FIG. 1 and FIG. 2 can be implemented as a complete system. FIG. 3 shows an exemplary embodiment of a system that would allow a user to generate a soft proof of a print image to be produced by one of a plurality of configurable color printers.

The system may contain multiple configurable color printers. Each printer may have at least one extra configurable colorant that can be changed as needed. The configurable colorants may be a set that extends the gamut of the printer. Alternatively, the configurable colorants may include custom made spot colors. Other alternative configurations are also possible.

In FIG. 3, the multiple printers are indicated by 302 and 304. While FIG. 3 shows only two printers, the number of printers is not limited in any way. Printers 302 and 304 are connected to a network 306 that allows for communication between the printers and a source of print jobs.

Print jobs 310 are received by an input and queue management module 312. The print jobs may actually originate from more than one source. For example, print jobs may be received via a network connection and/or the print jobs may be submitted by means of physical media, such as a flash drive or DVD-ROM.

The input and queue management module 312 accepts the print jobs 310 and stores the print jobs 310 on a storage medium 316. Storage medium 316 may be a disk drive that is part of a computing system, or it may be part of a networked file server.

The system includes a display terminal 320 and a user input device 322. The display terminal 320 and the user input device 322 are connected to a color conversion module 314.

When a user has submitted a print job 310 and wishes to select a printer to produce the job, the user can access the display terminal 320 and the user input device 322. The display terminal 320 and the user input device 322 may be directly connected to the color conversion module 314. Alternatively, the display terminal 320 and the user input device 322 may be part of a remote system that is connected to the color conversion module 314 via a networked connection.

When a user is to use the system, the user submits the job to be printed and then accesses the display terminal and user input device. By a suitable input mechanism, a user may select a particular print job that is stored by the job and queue management module 312 on storage medium 316. The job and queue management module 312, via the communication module 308, queries the printers, 302 and 304, to obtain status information for each printer.

The status information may include the state of any current printing activity and in particular the status information may include a profile for the current printer configuration. The profile information depends on the currently mounted configurable colorant and well as the permanently mounted colorant set. The profile information allows conversion of color information between the printer's device space and a standard color space. The standard color space may be CIEL*a*b* or some other device independent color space. Color profiles that provide this capability are defined by various specifications. One such specification is the International Color Commission (ICC) Profile Specification.

When the job and queue management module 312 receives the status information, the job and queue management module 312 stores the current profile information in profile storage medium 318. The profile information is thus available and may be updated only when the configuration of a printer changes.

A user indicates a desire to use the system by providing an input at the user input device 322. The input will identify the job which has been previously received by the input unit 312 and stored in storage medium 316. The color requirements of the job will be retrieved by the conversion module 314. The requirements may include a specification of specific colorant combinations thus indicating the possibility that one of the printers will have to be reconfigured to use the requested colorant sets. Since the reconfiguration may involve extra costs or delay, a user may wish to explore alternatives to the original color specifications.

The color conversion unit 314 will then examine the current profiles of the printers to see if one of the profiles matches. Alternatively, the color conversion unit 314 may display on the user display a list of the current printer configurations and allow a user to choose which of the printers to examine.

Once a printer has been chosen, either automatically by the color conversion unit 314 or by a user selection, the print job is converted from the color space, corresponding to the color specifications of the print job, to the color space of the selected printer. Then the converted printer color space version of the print job is displayed on the user display device. The display may involve using a device profile for the user display device to ensure that the displayed image will be a good representation of the print to be produced by the selected printer.

The color conversion unit 314 may allow the user to exercise a number of options relating to the display. These options may include adding to the display indications of any colors that are out of the printer's gamut. Another option may include allowing the user to display the image as it would be produced by the printer using alternative colorants to the original specification. For example, the user may be able to indicate that any requested spot colors be reproduced by the best CMYK equivalent.

The user may select among the installed printers to see which of these printers may provide the best combination of print quality, cost, and delivery time. After examining the available alternatives, the user can indicate that the job is to be produced using a printer that is configured other than the original specification. Alternatively, the user can indicate that the job is to be printed as originally specified which means that the job will be queued until the specified printer is available and properly configured.

Once the user has made a choice, the final selection is transmitted by the color conversion unit 314 to the input and queue management module 312 and the print job is queued for transmission to the selected printer.

While the system of FIG. 3 shows the system implemented as a set of connected modules, it will be apparent to those skilled in the art that the functions of the various modules in FIG. 3 may be implemented using software in connection with a general purpose computing system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for producing a soft proof of a color image to be printed on one of a plurality of configurable color printers, comprising:

receiving, from a configurable color printer, a profile, each of the plurality of configurable color printers being physically configured to receive a combination of colorants, the combination of colorants including four predetermined colorants and a replaceable fifth colorant, each profile including a specification that defines a plurality of transformations associated with the configurable color printer, each transformation represents a transformation between a color producible by the combination of colorants currently attached to the configurable color printer and a definition of the color in a device independent color space, the specification also defines a plurality of transformations that represent a transformation between a color producible by the four predetermined colorants currently attached to the configurable color printer and a definition of the color in a device independent color space;

generating an electronic color image using the received profile, the electronic color image being a representation of the color image to be printed as printed by the corresponding configurable color printer;

displaying the generated electronic color image;

determining if halftoning effects have been selected;

generating, when it has been determined that halftoning effects have been selected, a halftoning based electronic color image using the received profile and halftoning processes available to the corresponding configurable color printer, the halftoning based electronic color image being a representation of the color image to be printed as printed by the corresponding configurable color printer;

displaying the generated halftoning based electronic color image with the generated electronic color image;

determining if use of alternative colorants to produce a spot color in lieu of a spot color colorant has been selected, the alternative colorants being a combination of four predetermined colorants in lieu of the spot color colorant;

generating, when it has been determined that use of alternative colorants to produce a spot color in lieu of a spot color colorant has been selected, an alternative colorant based electronic color image using the received profile and the combination of four predetermined colorants in lieu of the spot color colorant, the alternative colorant based electronic color image being a representation of the color image to be printed as printed by the corresponding configurable color printer;

displaying the generated alternative colorant based electronic color image with the generated electronic color image;

determining if identification of out of gamut colors has been selected;

generating, when it has been determined that identification of out of gamut colors has been selected, a flagged electronic color image using the received profile, the flagged electronic color image identifying the out of gamut colors in the displayed color image;

displaying the flagged electronic color image;

determining if comparison with an alternative configurable color printer has been selected;

selecting, when it has been determined that comparison with an alternative configurable color printer has been selected; an alternative configurable color printer;

receiving, from the selected alternative configurable color printer, a profile corresponding to the selected alternative configurable color printer;

generating an alternative electronic color image using the received profile corresponding to the selected alternative configurable color printer, the alternative electronic color image being a representation of the color image to be printed as printed by selected alternative configurable color printer;

displaying the generated alternative electronic color image;

determining if cost and delivery information has been selected;

generating, when it has been determined that cost and delivery information has been selected, cost and delivery information for each displayed color image;

displaying the cost and delivery information for each displayed color image; and selecting, based on the displayed generated electronic color images, one of the plurality of configurable color printers to print the color image to be printed.

2. The method as claimed in claim 1, further comprising:

reproducing the color image to be printed on the selected configurable color printer.

3. The method as claimed in claim 1, further comprising:

displaying the color difference between the desired color and the color that the selected configurable color printer would produce at a location within the displayed generated electronic color image as selected by the user on the displayed generated electronic color image.

* * * * *